United States Patent [19]

Cahen

[11] 4,229,361

[45] Oct. 21, 1980

[54] HYDROGENATION CATALYST AND HYDROGENATION PROCESS

[75] Inventor: Raymond M. Cahen, Brussels, Belgium

[73] Assignee: Labofina S.A., Brussels, Belgium

[21] Appl. No.: 929,539

[22] Filed: Jul. 31, 1978

[30] Foreign Application Priority Data

Dec. 2, 1977 [LU] Luxembourg ............................ 78622

[51] Int. Cl.$^2$ ............................ C11C 3/12; B01J 31/02
[52] U.S. Cl. .................................... 260/409; 252/430; 252/431 N; 252/438
[58] Field of Search ........... 260/409; 252/430, 431 N, 252/438

[56] References Cited

U.S. PATENT DOCUMENTS

3,240,698  3/1966  Leak ...................................... 260/409

OTHER PUBLICATIONS

Brown et al., Chemical Abstracts, vol. 79, No. 125719d, (1973).

Hosoi et al., Chemical Abstracts, vol. 72, No. 54885x, (1970).

Suggitt et al., Chemical Abstracts, vol. 82, No. 3862m, (1975).

Primary Examiner—John F. Niebling
Attorney, Agent, or Firm—Schwartz, Jeffery, Schwaab, Mack, Blumenthal & Koch

[57] ABSTRACT

A nitrogen-containing nickel catalyst adapted for catalyzing partial and selective hydrogenation of natural oils is disclosed, which comprises nickel and such an amount of a nitrogen-containing basic compound which is equivalent to from about 5 to about 40 atoms of nitrogen per 100 atoms of nickel.

The catalyst is effective in catalyzing the partial hydrogenation of natural oils in such a manner that polyunsaturated compounds are selectively hydrogenated and the formation of saturated compounds, transisomers, and conjugated dienes is limited and liquid hydrogenation products can be obtained. The catalyst is prepared by treating a nickel catalyst with the nitrogen-containing compound at elevated temperatures optionally under hydrogen.

6 Claims, No Drawings

HYDROGENATION CATALYST AND HYDROGENATION PROCESS

BACKGROUND OF THE INVENTION

This invention relates to catalysts for selectively hydrogenating natural oils. Furthermore, the present invention relates to a process for selectively hydrogenating natural oils in the presence of these catalysts in order to reduce the content of these oils in polyunsaturated compounds with a minimum formation of solid compounds.

Some natural or vegetable oils, such as soybean oil, sunflower oil, colza oil, or corn oil, contain compounds having several double bonds (polyenic compounds), for instance three double bonds (trienic compounds) and two double bonds (dienic compounds), in admixture with compounds having only one double bond (monoenic compounds) and saturated compounds. For instance, soybean oil contains triglycerides of fatty acids comprising about 10% of linolenic acid (fatty acid containing 18 carbon atoms and three C=C double bonds), about 50% of linoleic acid (fatty acid containing 18 carbon atoms and two double bonds), about 25% of oleic acid (fatty acid containing 18 carbon atoms and one double bond), and saturated fatty acids (stearic and palmitic acids).

In order to increase the stability of these oils, it is necessary to significantly reduce the content in linolenic acid glycerides and, in part, the content in glycerides of dienic acids. This reduction of the amount of unsaturated compounds is most often carried out by hydrogenation. However, for some applications, for instance for the use of these oils as cooking oils or for preparing fatty acids for paints and coatings, the formation of solid products must be obviated or at least reduced. For these reasons, only a partial hydrogenation must take place and this hydrogenation must be selective.

It is of prime importance to limit:
(a) the formation of saturated compounds; polyenic compounds must therefore be hydrogenated to dienic and monoenic compounds;
(b) the isomerization of cis- to trans-isomers; however, isomerization occurs always during hydrogenation and this isomerization results in the formation of solid products, since the trans-isomers have a higher melting point than cis-isomers;
(c) the formation of conjugated dienic compounds, which are unstable.

It has already been suggested to carry out the selective hydrogenation of natural oils in the presence of copper catalysts. However, these catalysts have some drawbacks. For instance, it is necessary to avoid the presence of even traces of these catalysts in the partially hydrogenated products, since copper promotes oxidation of these products. Moreover, these copper catalysts are far less active than nickel catalysts. By contrast, hydrogenation in the presence of nickel catalysts is less selective and results in the formation of too high amounts of solid products.

SUMMARY OF THE INVENTION

It is an object of the present invention to provide a catalyst by which these drawbacks are avoided. It is a further object of this invention to provide an improved process for partial and selective hydrogenation of the polyenic components of natural oils. Another object of this invention is to provide such a hydrogenation catalyst and -process by means of which the formation of saturated compounds, of conjugated dienic compounds and of transisomers during the hydrogenation is limited.

In order to accomplish the foregoing objects according to the present invention, there is provided a nitrogen-containing nickel catalyst adapted for catalyzing partial and selective hydrogenation of natural oils comprising nickel and such an amount of a nitrogen-containing basic compound which is equivalent to from about 5 to about 40 atoms of nitrogen per 100 atoms of nickel. Preferably, the nitrogen-containing compound is absorbed on a nickel catalyst comprising nickel on a preferably inorganic support material.

According to the present invention there is further provided a process for partially and selectively hydrogenating a natural oil which comprises the steps of treating said natural oil in the presence of the above-defined nitrogen-containing nickel catalyst with hydrogen at a hydrogen pressure and a reaction temperature sufficient to selectively hydrogenate the polyunsaturated compounds of the oil and to limit the formation of saturated compounds, trans-isomers and conjugated dienes and to obtain a substantially liquid hydrogenation product rich in monoenic compounds.

Furthermore, according to the present invention, there is provided a process for preparing the above-defined nitrogen-containing nickel catalyst which comprises the step of treating a nickel catalyst with an appropriate amount of the nitrogen-containing compound.

Further objects, features and advantages of the present invention will become apparent from the following detailed description of the invention and its preferred embodiments.

DETAILED DESCRIPTION OF THE INVENTION AND ITS PREFERRED EMBODIMENTS

The catalyst according to the present invention for partial and selective hydrogenation of natural oils which contain compounds having at least two C=C double bonds comprises a hydrogenation-catalyzing nickel catalyst onto which such an amount of a basic nitrogen-containing compound has been absorbed, that it contains from about 5 to about 40 atoms of nitrogen per 100 atoms of nickel.

The process according to the present invention for partially and selectively hydrogenating natural oils which contain compounds having at least two C=C double bonds, comprises hydrogenating these natural oils in the presence of a nickel catalyst which has absorbed a basic nitrogen compound and comprises from about 5 to about 40 atoms of nitrogen per 100 atoms of nickel.

It has been found that hydrogenation of natural oils in the presence of this catalyst is particularly selective. Moreover, the yield in desired hydrogenated products is high and a remarkably high reaction rate is achieved.

In order to obtain stable hydrogenated products which are oily, the iodine value of the starting oil (which value for instance is between about 120 and 140 in the case of soybean oil) must be decreased for between about 10 and about 40 by the hydrogenating treatment. Moreover, the content of compounds containing at least three C=C double bonds in the hydrogenated oil must not exceed 2% and the content of fully saturated compounds and transisomers must be as low as possible. Moreover, the formation of unstable conjugated dienic compounds should be avoided.

These requirements are achieved by using a hydrogenating catalyst which is a nickel catalyst which has been treated with a basic nitrogen compound. The nickel catalyst which is used as starting material can be any nickel catalyst used in hydrogenating processes. Thus, the nickel catalyst can consist essentially of nickel metal or can be any supported nickel catalyst which comprises nickel on a conventional carrier material. This starting nickel catalyst is most often a commercially available supported nickel catalyst. In this starting catalyst, the major portion of nickel is metal nickel and the remainder is nickel oxide. A portion of the nickel, which does not generally exceed 10% thereof, may be substituted by a hydrogenating metal or metal oxide, such as cobalt, palladium, cerium oxide, zirconium oxide and the like. The term "nickel catalyst" as applied in the present specification and claims is meant to include catalysts which contain nickel and optionally a lower amount of other hydrogenation-catalyzing inorganic components. These catalysts generally contain an inorganic support material which may be an oxide of silicium and/or aluminum such as silica, kieselguhr, alumina, mixtures of silica and alumina, a titanium oxide and the like. The nickel content of the starting catalyst may vary between wide limits. For example, the nickel content of suitable commercially available support nickel catalysts may vary between about 10 and about 80% relative to the amount of the catalyst (not including any protective fatty layers).

The nitrogen containing nickel catalysts according to the present invention may be prepared by treating the starting nickel catalyst with a basic nitrogen-containing compound. Such basic nitrogen-containing compounds comprise ammonia, aliphatic and heterocyclic amines containing 1 to about 4 nitrogen atoms, and amides, which exhibit a basic reaction, e.g., carboxylic acid diamides. The respective basic nitrogen-containing compound may be chosen depending on various different factors, such as availability and price. As suitable nitrogen-containing compounds, the following may be cited: ammonia, urea, hexamethylenetetramine, aliphatic amines containing from about 4 to about 22 carbon atoms. When the starting nickel catalyst is treated with an aliphatic amine, it is advantageous to use an amine or a mixture of amines having a molecular weight which is not too high in order to avoid the presence of heavy components in the reaction mixture. For this reason, amines having a melting point lower than about 30° C., and preferably lower than about 25° C., such as coprah amines or lauric amine or mixtures of these amines, are advantageously used.

According to an embodiment of the process for preparing the nitrogen-containing catalyst according to the present invention, the starting nickel catalyst which is generally coated with a fatty protective layer is heated up to a temperature of about 50° to 85° C. (so that this layer melts) and is mixed with the nitrogen-containing compound, optionally under stirring. Optionally, the mixture is then heated under hydrogen to a higher temperature which may reach from about 150° to about 175° C. The catalyst is then cooled, optionally under vacuum. The resulting catalyst contains from about 5 to about 40 atoms of nitrogen per 100 atoms of nickel. A skilled in the art worker can easily select the necessary conditions for the treatment with the nitrogen compound, e.g., the suitable ratio between the amount of starting materials, depending on the composition of the starting catalyst and the composition and physical properties of the nitrogen compound, in order to get a catalyst having the desired nitrogen content.

The amount of catalyst which is used for the selective hydrogenation depends on many factors, namely on the kind of oil to be treated, on its purity, on the catalyst composition and on the working conditions. An active and selective hydrogenation which yields hydrogenated oils having the required iodine value is generally achieved when the amount of catalyst is equivalent to an amount of between 0.01 and about 0.75% of nickel, based on the weight of oil. Higher amounts of catalyst could be used, but without providing any economical advantage.

The hydrogenation reaction is conducted at a pressure which may vary between wide limits. Generally, the hydrogen pressure lies between about 0.5 and 10 kg/cm2, this range being particularly suitable to obtain a hydrogenated oil which fulfills the required specifications. The reaction temperature may vary between 100° and 175° C. According to an embodiment of the process of this invention, hydrogenation is conducted at 115°–150° C. and under a hydrogen pressure comprised between 0.5 and 7 kg/cm2.

The following examples are given to further illustrate the present invention, yet without limiting it.

EXAMPLE 1

A nitrogen-containing nickel catalyst is prepared by treating a commercial nickel catalyst (23.5 wt. % nickel, 12 wt. % kieselguhr, and 64.5 wt. % of protective fatty coating). The starting catalyst is heated up to 70°–80° C. (at this temperature the protective coating melts). A mixture of coprah amines (primary alkyl amines containing 5% of $C_8$-amines; 7% of $C_{10}$-amines, 48% of $C_{12}$-amines, 18% of $C_{14}$-amines, 12% of $C_{16}$-amines, and 10% of $C_{18}$-amines) is then added and mixed with the nickel catalyst at 70° C. for 2 hours. The resulting catalyst contains 9.8 atoms of nitrogen per 100 atoms of nickel.

Soybean oil is hydrogenated in the presence of this nitrogen-containing nickel catalyst. A 20 cylindrical reactor is charged with 10 of soybean oil and is heated up to 135° C. under nitrogen. The nitrogen-containing nickel catalyst is then added. Hydrogen is introduced up to a pressure of 3 kg/cm2 in the reactor. The flow rate of hydrogen is then maintained at 4 m3/hr. As the reaction is exothermic, temperature rises up to 140° C. and is kept at 140° C. during hydrogenation.

The catalyst is used in an amount corresponding to 0.1% of nickel, based on the weight of the oil.

The reaction is stopped when the refractive index of the hydrogenated oil is about 15° 50', said index is corresponding to a hydrogenated oil which exhibits an iodine value of 100. The reaction period is 76.5 minutes. The hydrogenated oil contains only 1.09 wt. % of solid products (as determined at 20° C.).

For the analysis, a transesterification of the oil with methanol is first carried out in a conventional manner and then the methyl esters are separated by chromatography, in order to determine the composition and the proportions of the acids of the oil. The determination of the amount of trans-isomers is carried out by infra-red spectrometry, measuring the intensity of the peak at 10.3μ. The intensity of this peak is compared with the intensity of the peak of the methyl ester of elaidic acid (transisomer of the acid having a straight chain with 18 carbon atoms and containing one C=C double bond).

The characteristics of the oil before and after hydrogenation are given in the following Table (percentages by weight).

| Characteristics | | Starting Oil | Hydrogenated Oil |
|---|---|---|---|
| Acid components: | $C_{18:0}$[a] | 4.0% | 6.0% |
| | $C_{18:1}$ | 22.0% | 49.1% |
| | $C_{18:2}$ | 55.6% | 31.0% |
| $C_{18:3}$ | | 7.2% | 1.0% |
| Trans-isomers | | — | 16.5% |
| Conjugated dienes | | 0.24% | 0.14% |
| Iodine value | | 131 | 100 |
| Content of solid products (at 20° C.) | | — | 1.09% |

[a] the figures 0, 1, 2, and 3 designate the number of C=C double bonds in the acid.

By way of comparison, the same procedure is repeated, but using the same nickel catalyst yet, which has not been treated with the nitrogen compound. The hydrogenated oil contains 6.47 wt. % of solid products (at 20° C.).

EXAMPLE 2

The commercial nickel catalyst of Example 1 is treated with the same amine as in this Example 1, by contacting the amine with the catalyst which is heated up to 70° C. The mixture is kept under vacuum at 70° C. for 30 minutes. The pressure is then increased to 25 kg/cm2 at 175° C. by introducing hydrogen. After 2 hours, the mixture is cooled. The catalyst contains 20 atoms of nitrogen per 100 atoms of nickel.

This catalyst is used for hydrogenating soybean oil as described in Example 1, within a period of 64 minutes.

The hydrogenated oil has the following characteristics (percentages by weight):

| $C_{18:0}$ | 6.8% |
|---|---|
| $C_{18:1}$ | 48.0% |
| $C_{18:2}$ | 31.0% |
| $C_{18:3}$ | 1.3% |
| Trans-isomers | 14.2% |
| Solid products (at 20° C.) | 1.82% |
| Iodine value | 100 |

EXAMPLE 3

The commercial catalyst described in Example 1 is heated to 70° C. and is then contacted with urea at 70° C. for 30 minutes under vacuum and under stirring. Hydrogen is then introduced and the pressure is increased to 25 kg/cm2, at 150° C., for 2 hours. The mixture is cooled under vacuum.

The catalyst contains 20 atoms of nitrogen per 100 atoms of nickel. This catalyst is used for hydrogenating soybean oil for 68 minutes, as described in Example 1.

The hydrogenated oil has the following characteristics (percentages by weight):

| $C_{18:0}$ | 6.0% |
|---|---|
| $C_{18:1}$ | 49.5% |
| $C_{18:2}$ | 30.5% |
| $C_{18:3}$ | 1.0% |
| Trans-isomers | 18.0% |
| Solid products (at 20° C.) | 1.75% |
| Iodine value | 100 |

EXAMPLE 4

The commercial catalyst described in Example 1 is heated to 70° C. and is kept under vacuum. Ammonia is then introduced and then the mixture is heated to 150° C. in the presence of hydrogen, at 20 kg/cm2 for 2 hours. The catalyst contains 20 atoms of nitrogen per 100 atoms of nickel.

This catalyst is used for hydrogenating soybean oil as described in Example 1, for 64 minutes. The hydrogenating oil has the following characteristics (percentages by weight):

| $C_{18:0}$ | 7.0% |
|---|---|
| $C_{18:1}$ | 47.5% |
| $C_{18:2}$ | 31.5% |
| $C_{18:3}$ | 1.1% |
| Trans-isomers | 15.8% |
| Solid products (at 20° C.) | 1.8% |
| Iodine value | 100 |

EXAMPLE 5

A catalyst is prepared as described in Example 4, but using hexamethylenetetramine instead of ammonia and heating the catalyst/amine mixture to a temperature of 175° C. under hydrogen.

The obtained catalyst, containing 20 atoms of nitrogen per 100 atoms of nickel, is used for hydrogenating soybean oil, as described in Example 1, for 63.5 minutes.

The hydrogenated oil has the following characteristics (percentages by weight):

| $C_{18:0}$ | 7.3% |
|---|---|
| $C_{18:1}$ | 47.3% |
| $C_{18:2}$ | 31.6% |
| $C_{18:3}$ | 1.3% |
| Trans-isomers | 14.9% |
| Solid products (at 20° C.) | 1.9% |

EXAMPLE 6

A catalyst containing 22.7% of nickel, 1.4% zirconium oxide, 11.8% of kieselguhr, and 64.1% of a protective fatty layer (percentages by weight) is heated to 80° C. (in order to melt this fatty layer). Lauric amine ($C_{12}$:94%; $C_{10}$:3%; $C_{14}$:3%) is then added and the mixture is heated to 70° C. for 2 hours.

The resulting catalyst contains 9.8 atoms of nitrogen per 100 atoms of nickel.

Soybean oil is hydrogenated for a period of 55 minutes in the presence of this catalyst as described in Example 1. The catalyst is used in an amount corresponding to 0.5% of nickel, based on the weight of oil.

The hydrogenated oil has the following characteristics (percentages by weight):

| $C_{18:0}$ | 5.7% |
|---|---|
| $C_{18:1}$ | 50.0% |
| $C_{18:2}$ | 30.5% |
| $C_{18:3}$ | 1.0% |
| Trans-isomers | 18.0% |
| Conjugated dienes | 0.16% |
| Solid products | 1.0% |

EXAMPLE 7

The procedure described in Example 3 is repeated, but using n-butylamine as nitrogen containing compound.

The resulting catalyst contains 20 atoms of nitrogen for 100 atoms of nickel. It is used for hydrogenating soybean oil as described in Example 1 for a period of 60 minutes.

The hydrogenated oil has the following characteristics (percentages by weight):

| | |
|---|---|
| $C_{18:0}$ | 7.0% |
| $C_{18:1}$ | 48.0% |
| $C_{18:2}$ | 31.0% |
| $C_{18:3}$ | 1.3% |
| Trans-isomers | 17.2% |
| Solid products (at 20° C.) | 2.9% |
| Iodine value | 100 |

EXAMPLE 8

The procedure described in Example 3 is repeated, but using triethylamine as nitrogen compound.

The resulting catalyst contains 20 atoms of nitrogen per 100 atoms of nickel. It is used for hydrogenating soybean oil as described in Example 1, but using an amount of catalyst corresponding to 0.035% of nickel, based on the weight of oil.

The hydrogenated oil has the following characteristics (percentages by weight):

| | |
|---|---|
| $C_{18:0}$ | 7.1% |
| $C_{18:1}$ | 47.5% |
| $C_{18:2}$ | 31.2% |
| $C_{18:3}$ | 1.3% |
| Trans-isomers | 16.1% |
| Solid products (at 20° C.) | 3.12% |
| Iodine value | 100 |

What is claimed is:

1. A process for partially and selectively hydrogenating a natural oil which comprises the step of treating said natural oil in the presence of a nitrogen-containing nickel catalyst comprising activated nickel and having incorporated therein by absorption an amount of a nitrogencontaining basic compound equivalent to from about 5 to about 40 atoms of nitrogen per 100 atoms of nickel with hydrogen at a hydrogen pressure and a reaction temperature sufficient to obtain a substantially liquid hydrogenation product rich in monoenic compounds and low in saturated compounds, trans-isomers and conjugated dienes.

2. The process as defined in claim 1, wherein the nitrogen-containing catalyst is present in an amount corresponding to from about 0.01 to about 0.75% of nickel, based on the weight of the natural oil.

3. The process as defined in claim 1, wherein the reaction temperature is between about 100° and about 175° C.

4. The process as defined in claim 1, wherein the hydrogen pressure is between about 0.5 and about 10 kg/cm2.

5. The process as defined in claim 1, wherein the treatment with hydrogen is carried out until the iodine value of the hydrogenation product is from about 10 to about 40 units lower than the iodine value of the starting oil.

6. A hydrogenated natural oil which is obtained by the process as defined in claim 1.

* * * * *